(12) United States Patent
Cleymans et al.

(10) Patent No.: US 12,286,509 B2
(45) Date of Patent: Apr. 29, 2025

(54) RADIATION CURABLE COMPOSITIONS

(71) Applicant: ALLNEX BELGIUM S.A., Drogenbos (BE)

(72) Inventors: Ruben Cleymans, Halle (BE); Jurgen Van Holen, Ninove (BE)

(73) Assignee: ALLNEX BELGIUM S.A., Drogenbos (BE)

( * ) Notice: Subject to any disclaimer, the term of this patent is extended or adjusted under 35 U.S.C. 154(b) by 884 days.

(21) Appl. No.: 16/980,965

(22) PCT Filed: Mar. 21, 2019

(86) PCT No.: PCT/EP2019/057015
§ 371 (c)(1),
(2) Date: Sep. 15, 2020

(87) PCT Pub. No.: WO2019/185431
PCT Pub. Date: Oct. 3, 2019

(65) Prior Publication Data
US 2020/0407495 A1   Dec. 31, 2020

(30) Foreign Application Priority Data
Mar. 27, 2018 (EP) .................... 18164290

(51) Int. Cl.
| | | |
|---|---|---|
| *C08G 63/682* | (2006.01) | |
| *C09D 4/06* | (2006.01) | |
| *C09D 11/101* | (2014.01) | |
| *C09D 11/104* | (2014.01) | |
| *C09J 167/02* | (2006.01) | |

(52) U.S. Cl.
CPC ........... *C08G 63/6826* (2013.01); *C09D 4/06* (2013.01); *C09D 11/101* (2013.01); *C09D 11/104* (2013.01); *C09J 167/02* (2013.01)

(58) Field of Classification Search
CPC .............................. C09D 4/06; C08G 63/6826
See application file for complete search history.

(56) References Cited

U.S. PATENT DOCUMENTS

| | | |
|---|---|---|
| 5,866,628 A | 2/1999 | Likavec et al. |
| 5,919,834 A | 7/1999 | Downs et al. |
| 9,446,430 B2 | 9/2016 | Mayr et al. |
| 9,505,873 B2 | 11/2016 | Weiser et al. |
| 2010/0051333 A1 | 3/2010 | Oki et al. |
| 2014/0005291 A1 | 1/2014 | Van Den Bergen et al. |
| 2016/0122581 A1 | 5/2016 | You et al. |

FOREIGN PATENT DOCUMENTS

| | | |
|---|---|---|
| EP | 1 411 077 | 4/2004 |
| JP | 58-91714 | 5/1983 |
| JP | 2000-517363 | 12/2000 |
| JP | 2016-522283 | 7/2016 |
| RU | 2 515 991 | 4/2011 |
| WO | 2002/38688 | 5/2002 |
| WO | 2005/085369 | 9/2005 |
| WO | 2008/004002 | 1/2008 |
| WO | 2008/015474 | 2/2008 |
| WO | 2012/136588 | 10/2012 |
| WO | 2012/136591 | 10/2012 |
| WO | 2012/136593 | 10/2012 |

OTHER PUBLICATIONS

International Search Report (ISR) issued May 7, 2019 in corresponding International (PCT) Application No. PCT/EP2019/057015.

*Primary Examiner* — Wenwen Cai
(74) *Attorney, Agent, or Firm* — Wenderoth, Lind & Ponack, L.L.P.

(57) ABSTRACT

The present invention relates to a radiation curable composition comprising: (I) A radiation curable component comprising a compound having at least one ethylenically unsaturated group and (II) A chlorinated polyester component that is prepared from (A) A polyol component which is substantially free of any Bisphenol A derivative compound and which is substantially free of any cyclic ether polyol compound, said polyol component comprising a polyol compound (Ai) which is cyclic and which has at least two hydroxyl groups, and (B) A polycarboxylic acid component comprising a compound (Bi) having at least one chlorine group and at least two carboxyl groups, (C) optionally at least one monoalcohol compound, (D) optionally at least one monocarboxylic acid compound, (III) optionally at least one polycarboxylic acid compound substantially free of chlorine groups.

12 Claims, No Drawings

RADIATION CURABLE COMPOSITIONS

The present invention relates to radiation curable compositions that are suitable for uses such as for example for coatings on various substrates, including plastic substrates, to the preparation of these compositions and their uses.

Radiation curable compositions are used in many different applications including food packaging products. In this field of course health concerns are of great importance.

Today Bisphenol A (BPA) is widely used in the chemical industry, including in food packaging area, as a starting reactant to manufacture different types of polymers. Apparently, residues of BPA can migrate in small amounts into food and beverages stored in materials made with BPA. The safety of BPA is questioned as this compound or its derivatives could potentially have some toxicity (endocrine, mutagenic, reprotoxic or carcinogenic effects are suspected). The chemical industry, manufacturers, consumers and downstream users are therefore looking for alternatives. The company Nestle for example has drawn up a recommendation to remove BPA from food packaging. Furniture manufacturers also prefer diminishing use of BPA based polymers. Thus there is in particular a market need for compounds of oligomeric or polymeric nature that would be able to replace Bisphenol A based oligomers or polymers.

WO2012/136588 describes a radiation curable composition comprising at least one ethylenically unsaturated compound (A) and at least one inert OH-terminated polyester (B) prepared from a polyol component that comprises ethylene glycol and from a polycarboxy component that comprises phthalic acid and/or phthalic anhydride. These polyesters can be further modified to bear moieties comprising photo-initiating activity. These compositions are used in for instance for lithographic and flexographic applications. Such compositions often present poor adhesion properties on substrates like plastics.

WO2012/136593 describes a radiation curable composition comprising at least one (meth)acrylated compound (A); and at least one inert polyester (B) that is prepared from a (i) polyol component comprising at least one cyclic ether polyol and (ii) from a polyacid component. Such composition can lead to poor properties of the cured coating (adhesion, yellowing).

US2010/0051333 describes an active energy-ray curable ink containing a conductive substance and a binder component. The binder component contains a chlorinated polyester and an active ray-polymerizable compound. The chlorinated polyester is chosen from common commercially available chlorinated polyesters like Ebecryl® 436 or Ebecryl® 438 which are obtained from BPA derived compounds. U.S. Pat. No. 9,446,430 describes BPA free coating compositions for use as protective coating for metal foodstuffs containers. The compositions are heat cured.

One of the objects of the present invention is to provide a new radiation curable composition which is free of BPA.

The invention provides a radiation curable composition comprising:
(I) A radiation curable component comprising a compound having at least one ethylenically unsaturated group and
(II) A chlorinated polyester component that is prepared from
 (A) A polyol component which is substantially free of any Bisphenol A derivative compound and which is substantially free of any cyclic ether polyol compound, said polyol component comprising a polyol compound (Ai) which is cyclic and which has at least two hydroxyl groups, and
 (B) A polycarboxylic acid component comprising a compound (Bi) having at least one chlorine group and at least two carboxyl groups,
 (C) optionally at least one monoalcohol compound,
 (D) optionally at least one monocarboxylic acid compound,
 (E) optionally at least one polycarboxylic acid compound substantially free of chlorine groups, and
(III) Optionally an additional radiation curable component comprising at least one oligomeric compound having at least two radiation curable ethylenically unsaturated groups.

It has been found that such radiation curable composition comprising a radiation curable component and a chlorinated polyester component as defined above permits to provide a BPA free product while presenting one or more advantages.

The use of chlorinated polyester components (II) may present one or more of the following advantages:
 They are believed to be non-toxic,
 they may have a good solubility with other components of a UV formulation (e.g. with acrylates),
 they may have low viscosity,
 they may have glass transition temperatures within acceptable range,
 they may have low yellowing,
 they may present some resistance to oxygen inhibition,
 they can be used in a primer for difficult substrates like metal and plastics,
 they can be used as adhesion promoter in inks.

Compositions of the present invention may present one or more of the following advantages:
 they allow to obtain acceptable hardness,
 they can be used in food packaging due to their very low migration properties,
 they may have very good flow properties,
 they have high UV reactivity,
 they may have low viscosity,
 they may have low yellowing,
 they may have good mechanical properties once cured (e.g. good scratch resistance),
 they are highly suitable for the making of inks and varnishes,
 they may exhibit improved adhesion on plastics,
 they can be used as primer on difficult substrates like e.g. metal and plastics,
 they can be used as adhesion promoter in inks,
 they can be used for the making of polymer matrixes of composite materials.

Advantages for the end-user include:
 a safer solution due to the possibility to avoid the use of BPA
 a better performing coating
 a better adhesion to difficult substrates such as plastics.

The absence of Bisphenol A and of derivatives of Bisphenol A in the composition according to the invention permits to follow current market recommendations and may contribute to provide final products with no toxicity concerns.

Derivatives of Bisphenol A typically include hydrogenated BPA, which is saturated dialcohol with a cycloaliphatic structure produced by hydrogenating Bisphenol. Although hydrogenated BPA is different than BPA, and has a saturated structure believed to be less prone to undergo degradation, it is often preferred to avoid it as well because hydrogenated BPA may contain residues of BPA due to its manufacturing process and because some consumers or end users prefer to exclude the presence of any derivative of BPA even if this derivative is not known to be related to any health concern.

The polyol component (A) is substantially free of any cyclic ether polyol compound. As it will be shown in a comparative example, it has been found that the presence of such cyclic ether polyol, such as for example isosorbide, has detrimental effect on the performances of the cured composition. Furthermore, the presence of cyclic ethers may cause yellowing of the cured composition.

The (chlorinated) polyester component present in the present radiation curable composition can be called an "inert resin". In the present context, a resin (polymeric component) is said to be "inert" as typically it contains no or few (meth)acrylate groups and thus cannot copolymerize during the radiation curing process. "Curable reactive groups" are those groups capable of participating in the cure reaction that takes place when the radiation curable composition of the present invention is exposed to energy radiation, such as UV radiation, electron beam and/or actinic radiation. Due to imperfections in manufacture or to degradation on storage, resins that are considered essentially free of reactive groups may actually have a small number of reactive groups. Preferred are resins with 0.1 or fewer equivalents of curable reactive groups per kilogram; more preferred is 0.01 or fewer; even more preferred is 0.003 or fewer; still more preferred is 0.001 or fewer; and most preferred is none.

Some common reactive groups that are used in radiation curable compositions are ethylenically unsaturated groups especially carbon-carbon double bonds in the form of e.g. (meth)acrylate groups and/or vinyl groups. Consequently, resins containing (meth)acrylate and/or vinyl groups in large amounts do not qualify as inert resins in the present invention. However, double bonds contained in aromatic rings are known to generally be inert during radiation curing. By "(meth)acrylate groups" is meant acrylate groups, methacrylate groups, and mixtures thereof. Acrylate groups are often preferred towards methacrylate groups.

The polyester used in the present invention comprises a chlorinated polyester which has some chlorine groups. Those chlorine groups may participate to the chemical modifications that are occurring during the polymerization reaction but such chlorinated polyester is still considered to be an inert resin because it does contain few or no ethylenic unsaturated groups.

The chlorinated polyester component (II) that is used in the present invention can be produced in any way known in the art, though usually it is obtained via a polycondensation reaction, which may include ring opening reaction. Chlorinated polyesters (II) of the invention can be prepared via a direct esterification reaction, possibly via a one-pot reaction. Typically chlorinated polyesters (II) of the invention are prepared from:
  a polyol component (A) as defined herein,
  a polycarboxylic acid component (B) as defined herein,
  optionally, a monoalcohol compound (C), which can be chlorinated or not,
  optionally, a monocarboxylic acid compound (D), which can be chlorinated or not,
  optionally, at least one polycarboxylic acid compound (E) substantially free of chlorine groups.

Typically polyesters (II) of the invention are prepared by reacting compounds (A), (B) and where present (C) and/or (D), and/or (E), preferably under anhydrous conditions, and preferably at a temperature between 120° C. and 220° C., more preferably between 150° C. and 200° C., until the reaction is substantially complete. The reaction may be facilitated by the addition of from 5 to 40%, preferably from 10 to 25%, by weight, of a solvent in order to reduce the viscosity of the pre-polymer. The solvent is preferably heptane, hexane or toluene. During this process, it is common to use catalysts to accelerate esterification reactions. Typical catalysts are strong acids like alkyl- and/or aryl sulphonic acids that are typically used in concentrations ranging from about 0.1 to about 2 wt %, or organo metal catalysts that are typically used in concentrations ranging from 0.01 to 0.1 wt %, relative to the total weight of component (II). Optional typical inhibitors are phenolic antioxidants like hydroquinone, methylether hydroquinone and the like, which are typically used in concentrations ranging from about 0.01 to about 0.5 wt %, relative to the total weight of compounds (II).

By "polyols" is meant to designate organic compounds bearing two or more hydroxyl groups. Diols are often preferred.

Cyclic polyols (Ai) are compounds containing at least one cyclic group and at least two hydroxyl groups.

The polyol component (A) used in the present invention comprises at least one compound (Ai) which contains at least one cyclic group and at least two hydroxyl groups. As said above, it is important that the polyester component is prepared from compounds which are altogether free of any BPA or BPA derivative compound and substantially free of any cyclic ether polyol compound. Thus the compound (Ai) contains a cyclic group which is not a cyclic ether group.

Preferably the polyol component used to prepare the polyester component (II) comprises from 5 to 100% by weight (wt %) of one or more cyclic polyols (Ai) and, optionally, from 0 to 95 wt % of other suitable polyols. Typically this polyol component comprises at least 10 wt %, often at least 20 wt %, usually at least 30 wt %, more typically at least 40 wt % of one or more cyclic polyols (Ai), relative to the total weight of the polyol component (A).

Preferred cyclic polyols (Ai) are chosen amongst: 1) aliphatic cycle based polyols for example: tricyclodecane dimethanol (TCDM); 2,2,4,4-tetramethyl-1,3-cyclobutanediol; 1,4-cyclohexane diol, 1,4-cyclohexanedimethanol (CHDM); 3(4),8(9)-bis-(hydroxymethyl)-tricyclo-[5.2.1.02,6]decane (TCDM); 1,4-bishydroxymethylcyclohexane, 1,3-bis(4-hydroxycyclohexyl)propane, 2,2,4,4-tetramethylcyclobutane-1,3-diol, 1,3- and, cyclooctanediol, norbornanediol, pinanediol, decalindiol; 1,2-dicyclohexylethane-1,2-diol, bicycle(2.2.2)octane-1,4-diol, or 2) aromatic cyclic diols for example 1,2-Benzenedimethanol; 1,3-Benzenedimethanol; 1,4-Benzenedimethanol. Particularly preferred components (Ai) are 1,4-bishydroxymethylcyclohexane, 1,4-cyclohexanediol, CHDM and 1,3-bis(4-hydroxycyclohexyl)propane.

Optionally one or more other polyols different from a cyclic polyol, may be used in addition to the cyclic polyol to prepare polyesters (II) used in the invention. The amount of other polyols typically varies from 0 to 95% by weight (wt %), relative to the total weight of the polyol component. Typically this amount of other polyol is at most 90 wt %, usually at most 80 wt %. Often this amount is at most 70 wt %, more often at most 60 wt %.

By other polyols is meant to designate in particular polyols that are different from cyclic polyols especially different from 1,4-cyclohexanedimethanol. Examples of other polyols that may be used in the context of the present invention include but are not limited to (poly)ethylene glycols (like for instance ethylene glycol, diethylene glycol and triethylene glycol); (poly)propylene glycols (like for instance propylene glycol, dipropylene glycol and tripropylene glycol); 1,3-propanediol, 2, 2-dimethyl-1,3-propanediol (neopentylglycol); 2-methyl-1,3-propanediol (MPD); 2-ethyl-2-butyl-1,3-propanediol; 1-ethyl-2-methyl-1,3-propanediol; 2-ethyl-2-methyl-1,3-propanediol; 1,3-butylene glycol; 1,4-butanediol; 2,3-butanediol; 2-butyl-2-ethyl-1,3 propanediol (BEPD); pentanediol; 2-methyl-2-ethyl-1,3-propane diol; 1,3-pentane diol; 2,2,4-trimethyl-1,3-pentane diol; hexyleneglycol; 1,6-hexanediol; 3-hydroxy-2,2-dimethyl propyl 3-hydroxy-2,2-dimethyl-propanoate (hydroxylpivalyl hydroxypivalate (HPHP); the hydroxypivalate of neopentyl glycol; 2,2,4-trimethyl-1,3-pentanediol (TMPD); trimethylolpropane; glycerol, pentaerythritol; dipentaerythritol, ethoxylated and/or propoxylated forms of any of these (such as for instance propoxylated glycerol); and mixtures thereof (of any of the above). Often the polyols are diols. However polyols of higher functionality may be used.

The polycarboxylic acid component used to prepare component (B) of the invention can contain one or more "polyacids". The word "polyacid" is meant to designate organic compounds bearing two or more carboxyl groups, also called carboxylic acid groups. The corresponding anhydrides or a suitable corresponding dialkylester of the polyacid may also be used. In the below description, the word "acid" or "polyacid" will be used, depending from the context, to designate an acid and/or a derivative of an acid for example an anhydride. An anhydride is usually the condensation product of a polyacid, usually of a diacid. When dialkylesters are used, dimethylesters and/or diethylesters are preferred. Preferred polyacids are diacids (i.e., polycarboxylic acids with two carboxylic acid groups per molecule).

In the practice of the present invention, the polyacid may be an anhydride.

When inert polyesters (II) are prepared via transesterification, the polyacid is substituted by a polyacid dialkyl ester (like a phthalic acid dialkylester). In general the alkyl chains of this ester have from 1 to 20, preferably from 1 to 8, more preferably from 1 to 4 carbon atoms. Dimethylesters and/or diethylesters are usually preferred. Preferably however the inert polyester (II) is obtained via an esterification reaction.

Preferably one uses polyacids selected from saturated and/or aromatic polyacids. Double bonds contained in aromatic rings are known to generally be inert during radiation curing (see above).

Examples of polyacids that may be used to prepare polyesters (II) of the invention include but are not limited to phthalic acid; phthalic anhydride; chlorendic acid; chlorendic anhydride; succinic acid; adipic acid; oxalic acid; glutaric acid; pimelic acid; malonic acid; butanedioic acid; glutaric acid; suberic acid; azelaic acid; sebacic acid; 1,12-dodecanedioic acid; succinic anhydride; adipic anhydride; trimellitic anhydride; pyromellitic dianhydride; 1,4-cyclohexane dicarboxylic acid (CHDA); 1,3-cyclohexanedicarboxylic acid; 1,2-cyclohexanedicarboxylic acid; 1,4-cyclohexane dimethylcarboxylic acid; citric acid; tartaric acid, trimellitic acid; pyromellitic acid; and dimer diacids such as Empol® 1018 or Pripol® 1013; and mixtures thereof. Also terephthalic acid and/or isophthalic acid may be used.

Particularly suitable are: phthalic acid; phthalic anhydride; isophtalic acid; terephtalic acid; adipic acid; oxalic acid; glutaric acid; malonic acid; butanedioic acid; glutaric acid; 1,4-cyclohexane dicarboxylic acid; 1,4-cyclohexane dimethylcarboxylic acid; and mixtures thereof.

Preferred are phthalic acid; phthalic anhydride; isophtalic acid; terephtalic acid; oxalic acid; malonic acid; and mixtures thereof. Also these compounds may be substituted by their corresponding dialkylester if the inert polyester (II) is prepared via transesterification, with dimethylesters and diethylesters being preferred.

It is important that the polycarboxylic acid component contains a compound (Bi) having at least one chlorine group. Preferably, the compound (Bi) contains at least 2 chlorine groups. More preferably it contains at least 3, at least 4, at least 5, or at least 6 chlorine groups on each molecule. Preferred polycarboxylic acid compounds (Bi) are chlorendic anhydride (containing 6 chlorine groups on each molecule), hexachlorophtalic anhydride or diacid and tetrachlorophtalic diacid or tetrachlorophtalic anhydride (containing respectively 6 and 4 chlorine groups on each molecule).

Monocarboxylic acid compounds (D), and/or monoalcohol compounds (C) are optional further building units of the polyester component (II).

The above polyesters (usually OH- or COOH-terminated), optionally, can be capped or functionalized with one or more of monocarboxylic acid compounds (D) and/or monoalcohol compounds (C).

According to a first variant of the invention the inert polyester is not capped or functionalized.

According to a second variant of the invention the inert polyesters are further reacted with these one or more of monocarboxylic, monoalcohol and/or chlorine-free polycarboxylic compounds (E). The inert polyester resins (II) can be prepared in various ways. Either an inert OH-terminated polyester is first prepared, which is then further reacted with one or more monocarboxylic compounds (D). Either an inert COOH-terminated polyester is first prepared, which is then further reacted with one or more monoalcohol compound (C). Alternatively, all ingredients are mixed to react in a one-pot system.

Examples of suitable monoalcohol compound (C) that can be used are: methanol; ethanol; isopropanol; n-propanol; sec-butanol; iso-butanol; n-butanol; tert-butanol; methylamyl alcohol; 2-methyl-1-butanol; cyclohexanol; or mixtures of any of these. Glycol ethers can also be used such as propylene glycol monomethyl ether, ethylene glycol monomethyl ether, propylene glycol t-butyl ether, ethylene glycol monopropyl ether, propyleneglycol monopropyl ether, propylene glycol isobutyl ether, propylene glycol monobutyl ether, ethylene glycol monobutyl ether, or mixtures of any of these.

Examples of suitable monocarboxylic acid compounds (D) that can be used are benzoic acid and substituted benzoic acid, or any combination thereof. Examples of substituted benzoic acid include tert-butyl benzoic acid (such as 4-tert-Butylbenzoic acid, 3-tert-Butylbenzoic acid, or 2-tert-Butylbenzoic acid), naphthalene carboxylic acid, 4-dimethylaminobenzoic acid, 2-(4-chlorobenzoyl)benzoic acid, o-benzoylbenzoic acid, 2-(4-Phenylbenzoyl)benzoic acid or any mixture thereof.

Inert polyesters (II) of the invention may have a number average molecular weight (Mn) of between 500 and 5000 Daltons. Inert polyesters (II) of the invention may have a weight average molecular weight (Mw) of between 1000 and 10000 Daltons.

Molecular weights (Mn or Mw) typically are determined via gel permeation chromatography (GPC), typically using polystyrene standards. Most typically the Mn and Mw are measured by GPC as described below.

Based on the total amount of compounds (I), (II) and (III), the amount of inert polyesters (II) in the binder in general is comprised between 15 and 85%, preferably between 20 and 80% by weight (wt %). More typically this percentage is at least 30 wt %, more preferably at least 40 wt %. Generally their amount does not exceed 70 wt %, more preferably it does not exceed 60 wt %.

Preferably the cured material comprising the inert polyesters (II) of the invention have a glass transition temperature (Tg) ranging from 35 to 100° C., as measured by DMA method ASTM D7028-07. Typically the Tg is at least 40° C., often at least 50° C. Typically the Tg is at most 160° C., more preferably at most 120° C.

The chlorine content of the chlorinated polyester (II) is preferably comprised between 5 and 75% of the weight of the undiluted chlorinated polyester (II). The chlorine content is preferably at least 10%, more preferably at least 15%. The chlorine content is preferably at most 50%, preferably at most 30%. More chlorination increases the cost of the raw material. Moreover the amount of chlorine is limited according to the chemical structure of the reactant. The compositions according to the invention optionally may comprise other inert resins (IV), which do not take part in the polymerization reaction like the ones described in e.g. WO2002/38688, WO2005/085369, WO2008/015474, WO2008/004002, EP1411077 and U.S. Pat. No. 5,919,834. By "other" is meant different from the inert chlorinated polyester (II). Examples of such optional inert resins (IV) typically include hydrocarbons (such as styrene based hydrocarbon resins), styrene allyl alcohols, acrylics (such as acrylic (co)polymers), (poly)urethane resins, polyethylen-evinylacetate resins, polyvinylchloride resins, chlorinated polyolefin resins and/or ketone resins. Particularly preferred examples of suitable inert resins (IV) have been described in WO2012/136591. Preferably the inert resin (IV) is an inert polyester that does not contain any isosorbide or other cyclic ether building blocks. For some examples, see for instance WO2012/136588.

The total amount of such optional inert resins (IV) or mixtures thereof, does usually not exceed 30 wt %, preferably this amount does not exceed 20 wt %, more preferably this amount does not exceed 10 wt %, based on the total weight of inert resins (II) and (IV). More in particular the composition of the invention can be substantially free from inert resins (IV).

By substantially free is meant that their amount is at most 10 wt %, typically at most 5 wt %, relative to the total weight of the composition. In a particular embodiment of the invention, no additional inert resins (IV) are present in the composition.

Based on the total amount of (I), (II), (III) and (IV), the total amount of inert resins (II) and (IV) in general is between 20 and 80% by weight. More typically this percentage is at least 30%, more preferably at least 40%. Generally their amount does not exceed 75%, more preferably it does not exceed 55% by weight.

The amounts (in wt %) of components belonging to the polyester part of the composition, i.e; the part containing inert resin (II) and optional inert resin (IV), are preferably as follows:
  Cyclic polyol: preferably at least 5%, preferably maximum 100 wt % of the total weight of all polyols present in component (II)+component (IV),
  Other polyol: preferably at least 5%, preferably maximum 95 wt % of the total weight of all polyols present in component (II)+component (IV),
  Chlorinated polyacid or anhydride: preferably at least 5 wt %, preferably at most 100% of all polyacids present in component (II)+component (IV).
  Other, non-chlorinated, polyacids/anhydrides: preferably more than 0 wt %, preferably maximum 95% of the total weight of polyacids/anhydrides present in components (II)+(IV).

The radiation curable composition according to the invention comprises at least one radiation curable component (I) and optionally an additional radiation curable component (III). Components (I) and (III) comprise compounds having ethylenically unsaturated group(s), preferably (meth)acrylate groups also called (meth)acrylated compounds, more preferably acrylated compounds. They can be in the form of monomers, oligomers, polymers or mixtures thereof. Oligomers and polymers both contain repeating monomer units, a polymer having significantly more monomer units than an oligomer. Preferred are those that are liquid at room temperature. Some examples of suitable compounds are given below.

The optional additional radiation curable component (III) comprises not only at least two ethylenically unsaturated groups (typically acrylate groups) but also another functional group. Preferably, this functional group is chosen amongst: urethane, ester, ether, epoxy, amino and acrylic. Typically, component (III) is a polymer or an oligomer.

Examples of (meth)acrylated oligomers or polymers that can be used in the present invention as components (III) include: polyester (meth)acrylates, urethane (meth)acrylates, alkoxylated (meth)acrylated oligomers, epoxy (meth) acrylates, aminated (meth)acrylates, (meth)acrylated (meth) acrylics, or mixtures thereof.

Examples of suitable polyester (meth)acrylates are acrylated epoxidized soybean oil compounds like EBECRYL® 860 (allnex), fatty acid containing polyester (meth)acrylates like EBECRYL® 870, EBECRYL® 657, EBECRYL® 450 (allnex), and polyester (meth)acrylates like EBECRYL® 800, EBECRYL® 884, EBECRYL® 810 and EBECRYL® 830 (Allnex).

Examples of suitable urethane (meth)acrylates are EBECRYL® 284, EBECRYL® 264, EBECRYL® 210, EBECRYL® 230, EBECRYL® 1290 (Allnex). Examples of suitable aminated (meth)acrylates are EBECRYL® 80, EBECRYL® 81, EBECRYL® 83, EBECRYL® 7100, P115 and others.

Compounds (III) typically have a molecular weight (MW), and more in particular a weight average molecular weight, of from 200 to 5000 Daltons. Typically the MW of these compounds is at least 300 and more preferably at least 500 Daltons. Typically the MW of these compounds is at most 2000 and more preferably at most 1000 Daltons.

In particular embodiments however, the composition of the invention is substantially free from such compounds (III). By substantially free is meant that the amount of compounds (III) in the composition is at most 10 wt %, typically at most 5 wt %, relative to the total weight of the composition.

Most typically however ethylenically unsaturated compounds present in the composition are mostly present as a component (I) which is liquid at room temperature and has a low molecular weight. Such compounds are typically called reactive diluents. They usually have a molecular weight below 500 Daltons. Typically these reactive diluents used as component (I) are monomers. Monomers used can be mono- and/or poly-functional (meth)acrylates. Especially the acrylated forms are used. Preferably, compositions of the invention comprise at least one monomer (I) selected from mono(meth)acrylates, di(meth)acrylates and/or tri(meth) acrylates and/or tetraacrylate and/or pentaacrylates and/or hexaacrylates.

Examples of suitable compounds (I) include but are not limited to butyl(meth)acrylate, methyl(meth)acrylate, isobutyl(meth)acrylate, 2-ethylhexyl(meth)acrylate, cyclohexyl(meth)acrylate, n-hexyl(meth)acrylate, isobornyl (meth)acrylate, iso-octyl(meth)acrylate, n-lauryl(meth)acrylate, octyl/decyl(meth)acrylate, 2-hydroxyethyl(meth) acrylate, 2-hydroxypropyl(meth)acrylate, phenoxyethyl (meth)acrylate, nonylphenolethoxylate mono(meth)acrylate, 2-(-2-ethoxyethoxy)ethyl(meth)acrylate, 2-butoxyethyl (meth)acrylate, 1,6-hexanediol di(meth)acrylate (HDD(M) A), di or tri propylene glycol di(meth)acrylate (DPGD(M)A, TPGD(M)A), ethoxylated and/or propoxylated neopentylglycoldi(meth)acrylate, pentaerythritoltri(meth)acrylate (PETI(M)A) and the ethoxylated and/or propoxylated derivatives thereof, trimethylolpropanetri(meth)acrylate (TMPT(M)A) and the ethoxylated and/or propoxylated derivatives thereof, di-trimethylolpropanetri(meth)acrylate (diTMPT(M)A)glycerol tri(meth)acrylate and the ethoxylated and/or propoxylated derivatives thereof, the di(meth) acrylate of a dianhydrohexitol (like isosorbide di(meth) acrylate) and the ethoxylated and/or propoxylated derivatives thereof, phenylglycidylether(meth)acrylate and the ethoxylated or/and propoxylated derivatives thereof, the (meth)acrylates obtained from the esterification with (meth) acrylic acid of aliphatic glycidyl ethers, especially those wherein the alkyl chain comprises from 6 to 24 carbon atoms, more preferably from 8 to 18 carbon atoms, and/or of glycidyl esters of saturated and unsaturated carboxylic acids, especially the glycidyl esters of long chain alkyl carboxylic acids wherein the alkyl chain comprises from 6 to 24 carbon atoms, more preferably from 8 to 18 carbon atoms.

Preferred monomers (I) are di- and/or tri-(meth)acrylated monomers such as 1,6-hexanediol di(meth)acrylate (HDD (M)A), di or tri propylene glycol di(meth)acrylate (DPGD (M)A, TPGD(M)A), trimethylolpropanetri(meth)acrylate (TMPT(M)A) and the ethoxylated and/or propoxylated derivatives thereof, pentaerythritoltri(meth)acrylate (PETI (M)A) and the ethoxylated and/or propoxylated derivatives thereof, glyceroltri(meth)acrylate and the ethoxylated and/or propoxylated derivatives thereof, the di(meth)acrylate of a dianhydrohexitol (like isosorbide di(meth)acrylate). Particularly preferred are dipropyleneglycol diacrylate (DPGDA), tripropyleneglycol diacrylate (TPGDA) and/or trimethylolpropane tri(meth)acrylate (TMPTA). Another preferred compound (I) is dipentaerythritol hexaacrylate (DPHA).

The chlorinated polyester component (II) of the invention is typically soluble in the reactive diluent (I).

The above diluting monomers (I) can, optionally, be further reacted with an amine to form an amino (meth) acrylate having residual free (meth)acrylate groups. By "residual free" is meant (meth)acrylate groups that remain after reaction with the amines. Preferred are amino (meth)acrylates with two or three (meth)acrylate groups per molecule after reaction with the amines. The (meth)acrylate group preferably is an acrylate group.

Amino (meth)acrylates can be added as such to the composition of the invention but may also be formed in situ by introducing the amine to the blend of inert polyesters (II) and (meth)acrylated compounds (III). The amines used in this reaction are generally selected from primary amines and secondary amines. Generally preferred are primary amines comprising at least one primary amino group (—NH2) and/or secondary amines comprising at least two secondary amino groups (—NH).

Examples of suitable amino (meth)acrylates include EBECRYL® 7100, EBECRYL® 80, EBECRYL® 81, EBECRYL® 83, EBECRYL® 84, EBECRYL LEO® 10551, EBECRYL LEO® 10552 & EBECRYL LEO® 10553, all available from allnex.

Amino (meth)acrylates and amine derivatives in general can act as photoactivators and enhance cure speed in the presence of type II photoinitiators, and benzophenone derivatives in particular.

Based on the total amount of components (I), (II) and optionally (III), the total amount of (meth)acrylated compounds (I) and (III) in general is between 15 and 85% by weight of the radiation curable composition. More typically this percentage is at least 20%. Generally their amount does not exceed 75%, preferably it does not exceed 65% by weight, more preferably it does not exceed 60% by weight.

Typically, on the total amount of radiation curable compounds ((I) and (III)), the amount of diluting monomers is between 20 and 100% by weight. More typically this percentage is at least 50%, more preferably at least 80%, generally it is 100%.

Viscosity of the binder, more in particular the blend composed of compounds (I), (II) and (III), typically ranges from 1000 to 500000 mPa·s at 25° C., as measured using a cone and plate type rheometer with an adapted spindle and shear rate.

Compositions according to the invention can be prepared by any method suitable therefore. They are usually prepared by dissolving the chlorinated polyester component (II) and where present (III) in at least part of the (meth)acrylated compounds (I) added, preferably at a temperature of at least 20° C., more preferably of at least 30° C., most preferably of at least 60° C. The temperature preferably does not exceed 150° C., more preferably it does not exceed 110° C. The compositions according to the invention can be prepared in the presence of an organic solvent, which is thereafter eliminated from the composition, for example by stripping. Other ingredients can be added to the composition. More preferably, no solvents are used.

Other compounds can be added like pigments, dispersing agents or other additives, charges and photoinitiator. Often a photoinitiator and, optionally, a photoactivator are added.

Generally, the composition of the present invention comprises at least 10 wt %, more preferably at least 15 wt % and most preferably at least 20 wt % of (meth)acrylated compounds (I), based on the total weight of the composition. The amount of such compounds (I) in the composition usually does not exceed 85 wt %, preferably does not exceed 75 wt % and more preferably does not exceed 65 wt %.

Generally, the composition of the present invention comprises at least 20 wt %, more preferably at least 30 wt % by weight and most preferably at least 40% by weight of the inert resins (II) and (IV), based on the total weight of the composition. The amount of inert resins (II) and (IV) in the composition usually does not exceed 75% by weight, preferably does not exceed 65% by weight, and more preferably does not exceed 55% by weight.

Typically the compositions of the invention comprise, based on the total weight of (I), (II), (Ill) and (IV), between 15 and 85 wt % of the compounds (I) and between 85 and 15 wt % of inert resins (II) and (IV).

Generally, the composition of the present invention comprises at least 30 wt %, more preferably at least 40 wt % and most preferably at least 50 wt % of the inert resins (II), based on the total weight of the composition.

Compositions of the invention typically are cured by ultraviolet irradiation, generally in the presence of photoinitiator, which may be a polymeric photoinitiator. They can also be cured by electron-beam irradiation, allowing the use of compositions free of photoinitiator. The compositions according to the invention are providing extremely rapid curing.

Photoinitiators where present typically are added in an amount of from 0.1 to 10 parts by mass per 100 parts by mass of photopolymerizable compounds. Examples of suitable photoinitiators include but are not limited to an aryl ketone type photoinitiator (such as an acetophenone, a benzophenone, an alkylaminobenzophenone, a benzyl, a benzoin, a benzoin ether, a benzoin dimethyl ketal, a benzoyl benzoate or an [alpha]-acyloxime ester), a sulfur-containing photopolymerization initiator (such as a sulfide or a thioxanthone), an acylphosphine oxide (such as an acyldiarylphosphine oxide) or other photopolymerization initiators. The photopolymerization initiator may be used as a mixture of at least two types thereof in combination. Further, the photopolymerization initiator may be used in combination with a photosensitizer such as an amine.

Alternatively, or in addition compositions of the invention may comprise at least one radical polymerization initiator such as benzoyl peroxide, methyl cyclohexanone peroxide, cumene hydroperoxide, diisopropyl benzene peroxide, di-t-butyl peroxide, t-butyl peroxide and the like.

Compositions of the invention may further comprise, if the case requires, at least one of the following: an ultraviolet absorber, a photostabilizer, an antioxidant, a thermal polymerization inhibitor, a leveling agent, a defoaming agent, a thickener, a sedimentation-preventing agent, a pigment (organic coloring pigment, inorganic pigment), a coloring dye, an infrared absorber, a fluorescent brighter, a dispersant, an antistatic agent, an anti-fogging agent, and/or a coupling agent.

In a particular embodiment of the invention, the composition is a coating composition. Coating compositions can be clear (e.g. lacquers or varnishes) or pigmented. Coating compositions of the invention may be used in a wide variety of applications and on a wide variety of substrates and articles including molded articles.

Substrates that may be treated or coated with compositions of the invention include metal, wood, paper, concrete, plastics (porous and non-porous), glass, as well as coating surfaces. Articles or materials to which the coating composition is applied may for instance already contain one or more coating layers (e.g. articles or material may already contain a primer or a base coat).

Coating compositions of the invention can in particular be applied to paper, wood, metal, concrete and plastic.

Compositions of the invention in particular exhibited excellent adhesion on plastics, including polyvinylchloride (PVC), polypropylene (PP), BOPP (bioriented polypropylene), polycarbonate, polyethylene, polyethylene terephtalate (PET), acrylonitrile butadiene styrene copolymers etc.

A composition of the invention can be used to for ink or overprint varnish. It can also be used as an adhesive. The ink may be an ink used in lithographic, flexographic or inkjet applications. Inks of the invention may be used in the packaging industry.

Curing time and conditions may vary according to the constituents of the composition, the thickness of the coating film and the active energy ray source used. Usually curing is achieved by irradiation for about 0.1 to about 60 seconds. Further, for the purpose of completing the curing reaction, a heat treatment may be carried out after irradiation with active energy rays.

Compositions of the invention can be applied via any suitable technique used in the art that includes but are not limited to brush coating, dip coating, roller coating, curtain coating, spray coating, vacuum coating, flexo printing, gravure printing, lithographic printing, inkjet printing etc.

Compositions of the invention typically have a viscosity at 60° C. in the range of from 400 to 40000 mPa s. More preferably the viscosity at this temperature is in the range of from 400 to 20000 mPa s, most preferably from 400 to 10000 mPa s.

Though solvents may be used, compositions of the invention typically comprise at most 0.1% by weight of solvents. Usually this amount is at most 0.01% by weight, more preferably at most 0.001% by weight.

Compositions according to the invention after curing further permit to obtain excellent adhesion on various organic and inorganic substrates such as plastic, metal, glass, wood, paper, in combination with high cure speed and low viscosity. In particular adhesion on plastic substrates like polypropylene, bioriented polypropylene, polyethyelene, polyethylene terephtalate, polyvinylchloride, polyester and polyamide films can be excellent. Plastics can be of any type, e.g. the woven or non-woven type, it can be porous or permeable etc. The plastic can be rigid but preferably is flexible.

An advantage of the compositions of the invention is that they permit to obtain good adhesion on e.g. plastics without the need of an (or another) adhesion primer. The possibility to graft functional groups on the polyester resin (II) can further improve adhesion and reactivity.

Pigment wetting is excellent which makes the compositions of the invention useful as ink vehicle for the preparation of inks, in particular inks for gravure, for lithographic, screen and flexographic applications.

The compositions of the invention are particularly suited for printing onto a wide variety of rigid and flexible graphics, packaging and label substrates, as well as most plastics, glass and metal foil. The compositions of the invention are very suited for gravure, flexographic and lithographic applications. They are most suited as flexo inks for narrow, mid and wide web applications. They are further also highly suited as litho inks.

The composition of the present invention is therefore useful as ink vehicle for the preparation of inks. Typical ingredients used in the preparation of inks (paste or liquid) may thus be added. These compounds are generally selected from organic and inorganic pigments, photoinitiators, fillers and additives.

Pigments which can be used in the compositions of the invention are for example every pigments used in paste inks or liquid inks. A list of such pigments can be found in the Color Index. The pigments are preferably used at 0 to 60% by weight of the total weight of the composition, more preferably at 1 to 50% by weight. Useful commercial pigments are, for example: Process Yellow 13 (Diarylide Yellow—Irgalite BAW of Ciba, Permanent GR of Clariant), Process Magenta Pigment 57 (Bona Calcium—Ilobona 4BY of Sun, Irgalite SMA of IGM), Process Blue 15.3 (Copper Phthalocyanine—Irgalite GLO of IGM, Hostaperm Blue B2G of Clariant), Process Black 7 (Oxidised Carbon Black—Special Black 250, Special Black 350 of Degussa).

The photoinitiators usable in the compositions of the invention are well known in the art. They can be chosen from α-hydroxyketones, α-aminoketones, benzildimethylketals, acyl phosphines, benzophenone derivatives, thioxanthones and blends of these. They are used at 0 to 15% by weight. Generally, photoactivators are chosen between amine derivatives and amino(meth)acrylates such as EBECRYL® P115, EBECRYL® P116, EBECRYL® 7100, EBECRYL® 80, EBECRYL® 81, EBECRYL® 83, EBE- CRYL® 84, EBECRYL LEO® 10551, EBECRYL LEO® 10552 & EBECRYL LEO® 10553, all available from allnex. In general photoinitiators and possibly also photoactivators are added if the compositions are cured by ultraviolet light. The compositions may however also be cured by electron beams rays, and, in this case, no photoinitiator or photoactivator needs to be added to the composition. In addition, advantageously no or less photoiniator needs to be added to the composition when a moiety with photoinitiating activity is present in the composition. For example a benzophenone derivative can be grafted onto the inert polyester of the invention.

The additives are usually those commonly used in inks, such as stabilizers, substrate wetting agents, anti-foam agents, dispersing agents, etc. The total amount of those additives does usually not exceed 10%.

As fillers, products such as calcium carbonate, talc (magnesium silicate), kaolin clay (aluminium silicate), barium sulphate, aluminum hydroxide, silicium dioxide can be used. The amount of fillers is generally from 0 to 15% by weight of the total weight of the composition.

The composition according to the invention comprises, based on the total weight of the composition, from 20 to 70% by weight of the binder (containing components (I), (II), (III) and (IV)), from 0 to 50% by weight of pigments, and from 0 to 50% by weight of one or more usual ingredients selected from additives, fillers, photoinitiators and the like. Typically the compositions of the invention comprise, based on the total weight of the composition, at least 20% by weight of the binder, often at least 40% by weight of binder.

An aspect of the invention relates to coating compositions and in particular inks and varnishes that comprise the binder composition as described above. Provided are inks and varnishes that are prepared from the binder compositions of the invention. The invention also relates to a process for the preparation of inks, in particular flexographic, litho inks and screen inks, wherein a binder composition according to the invention is used.

Flexographic inks are generally made in 2 steps, the pigment dispersion step and the letdown step. The composition according to the invention can be used in one or both of these steps. The composition according to the invention is preferably used as binder at least in the first step. In the first step, the pigments and optionally a photoinitiator, fillers and/or additives are added to at least part of the composition comprising the resin (II), the resin (IV) and (meth)acrylated compounds ((I) and (III)). They are mixed and then dispersed on a triple roll or bead mill. A few passes might be necessary to achieve a good dispersion. Pigments that are difficult to disperse generally require more number of passes. The compositions according to the invention showing good pigment wetting, permit to limit the number of additional passes.

The composition, for example a finished ink preferably has a viscosity higher than 300 mPa·s measured at a shear rate of 2500 s−1 at 25° C. (measured using a cone and plate type rheometer with a cone diameter of 25 mm and at an angle of 1° for the cone). The measurement is generally done by measuring a flow curve in controlled shear rate ranging from D=0.1 s−1 to D=2500 s−1 at 25° C.

The finished ink preferably has a viscosity measured as here above of at least 500 mPa·s. The viscosity of the final composition generally does not exceed 8000 mPa·s, preferably it does not exceed 4000 mPa·s (at 25° C. and 2500 s−1).

The finished ink is then printed onto the substrate. The ink film can then be cured under a UV lamp, for example at 120 W/cm and 50 m/min. A few passes may be required to cure the ink if the binder is not reactive enough.

An aspect of the invention concerns the use of a composition of the invention for the making of an ink, an adhesive or a coating (including an overprint varnish).

A further aspect of the invention concerns a composite matrix (clear or pigmented) comprising at least one composition according to the invention, and at least one reinforcement material. The reinforcement material used can be fibrous or non-fibrous. Examples of non-fibrous materials include but are not limited to alumina trihydrate, barium sulfate, calcium carbonate, clay, glass microspheres, kaolin, metal fillers, carbon black, mica, organic fillers (wood flour, corncobs, rice/peanut hulls, and nutshells), silicas, talc, wollastonite and other nano-sized materials. Examples of fibrous materials include but are not limited to boron fibers, carbon fibers, aramid fibers, ceramic fibers, glass fibers, natural (such as but not limited to hemp, jute, flax, kenaf, leaf fibers) or synthetic fibers as described in U.S. Pat. No. 8,012,573, EP2226171, U.S. Pat. No. 7,250,209. Often a glass filler is used as reinforcement material. Examples of suitable glass fillers include but are not limited to glass fibers, glass cloths, nonwoven glass fabrics and other glass fiber cloths, glass beads, glass flakes, glass powders, milled glass species and so forth. Among them, glass fibers, glass cloths and nonwoven glass fabrics are preferred in view of their being highly effective in reducing the coefficient of linear expansion. Glass cloths are most preferred.

The invention also relates to the polymeric compositions obtainable by curing the radiation curable composition, as well as to substrates or articles being partially or entirely coated with the polymeric composition.

The invention also relates to a process for coating an article or a substrate comprising the step of applying onto at least one surface of said article or of said substrate the composition of the invention, following by curing of the applied layer. The composition of the invention can be directly applied onto said substrate or said article without the need of an adhesion primer. A physical treatment (e.g. corona) and/or chemical treatment before applying the radiation curable composition can be preferred in some cases. The composition of the invention can be applied in one or more layers of between 0.5 and 10 µm by means of flexographic process, lithographic process, gravure, screen printing, letterpress, roller coater, curtain coater. Preferably, it is applied by flexographic process. The material or surface to be coated can comprise plastic, in particular can be made of plastic, including a non polar plastic. The plastic can be flexible or rigid.

Further provided is also a method of improving adhesion of a radiation curable ink to a substrate in a printing process, said method comprising the step of applying a composition of the invention (more in particular an ink of the invention) to a surface of the substrate followed by a step of curing by radiation, typically ultraviolet radiation. The composition of the invention can be applied in one or more layers of between 0.5 and 10 µm by means of flexographic process, lithographic process, gravure, screen printing, letterpress, roller coater, curtain coater. Preferably, it is applied by a flexographic process. The material or surface to be coated can comprise plastic, in particular can be made of plastic, including a non polar plastic. The plastic can be flexible or rigid. An advantage of this process is that the composition of the invention can be applied directly onto the substrate. In other words, no primer layer needs to be applied first. Typically the substrate is a packaging or a label substrate for indirect food contact.

Yet another aspect of the invention concerns the use of a composition of the invention as adhesion promoter for inks on a plastic, for instance a plastic packaging. The packaging can be a food packaging such as a food packaging for indirect food contact.

The invention also relates to a flexible graphic, more in particular a packaging or label substrate, that is printed with a composition (more in particular an ink) according to the invention. The packaging can be a food packaging such as a food packaging for indirect food contact.

Still a further aspect of the invention concerns the use of a composition of the invention as primer on a difficult substrate, e.g. plastic or metal. The substrate can be plastic or a plastic containing material, in particular it can be a packaging. The packaging can be a food packaging such as a food packaging for indirect food contact.

The invention may also be characterized by one or more of the following:

- The radiation curable composition as defined above, wherein the polyol component (A) additionally comprises an acyclic aliphatic polyol compound (Aii), optionally including at least one ether function.
- The radiation curable composition as defined above, wherein the polyol component (A) comprises at least 5% by weight of one or more cyclic polyol(s) (Ai).
- The radiation curable composition as defined above, wherein the polyol component (A) comprises at least 20% by weight of one or more cyclic polyol(s) (Ai).
- The radiation curable composition as defined above, wherein the cyclic polyol compound (Ai) comprises 1,4-cyclohexanedimethanol (CHDM).
- The radiation curable composition as defined above, wherein the compound (Bi) comprises chlorendic acid.
- The radiation curable composition as defined above, wherein the polycarboxylic acid compound (E) comprises phtalic acid.
- The radiation curable composition as defined above, wherein the equivalent ratio of hydroxyl groups to carboxyl groups exceeds 1.0.
- The radiation curable composition as defined above, wherein the chlorinated polyester (II) has a number average molecular weight comprised between 500 and 5000 Daltons.
- The radiation curable composition as defined above, wherein the ethylenically unsaturated compound (I) comprises at least one (meth)acrylated compound selected from di(meth)acrylates and/or tri(meth)acrylates and/or tetra(meth)acrylates and or penta(meth)acrylates and/or hexa(meth)acrylates.
- The radiation curable composition as defined above, comprising at least 10% by weight of the chlorinated polyester component (II).
- The radiation curable composition as defined above, comprising at least one additive chosen amongst the following list: photoinitiator, pigment, wetting agent, pigment dispersant, leveling agent, inhibitor, dispersing agent, stabilizer, antifoam agent, filler.
- The radiation curable composition as defined above, comprising an additional radiation curable component (III) comprising an oligomeric compound having at least two radiation curable ethylenically unsaturated groups and a backbone comprising one or more of the following groups: ester, ether, urethane epoxy, acrylic amino group.
- An adhesive, coating, ink or varnish composition comprising a radiation curable composition as defined above.
- An article coated, partially or entirely, with a radiation curable composition as defined above.

The invention will now be described in more details in the examples below, which in no way are intended to be limited.

Throughout the invention and in particular in the examples the following measuring methods have been applied.

Molecular weight determination via GPC: A small portion of sample is dissolved in tetrahydrofuran (THF) and injected into a liquid chromatograph (Merck-Hitachi L7100) equipped 3×PLgel 5 μm Mixed-D LS 300×7.5 mm column. Typically polystyrene standards (typically in the Molecular Weight range 200-400.000 g/mol) are added as internal standards. The components of the sample are separated by the GPC columns based on their molecular size in solution and detected by a Refractive Index detector. Data typically are gathered and processed by Polymer Laboratories Cirrus GPC software.

Cure speed: max belt speed under a given UV lamp, giving a full cured film, measured by solvent rubs (ADR: acetone double rubs). A minimum of 50 ADR is required for a fully cured coating with optimum performance.

Viscosity: Cone & plate viscosity at a given temperature, usually 25° C., and a given rotation speed of the spindle, also referred to as shear rate.

Shortness index (SI): Ratio of viscosity at 2.5/2500 1/s shear rate.

Gloss: Gloss is measured by means of a TRI-MICRO-GLOSS 20-60-85 SHEEN apparatus. Measurements are made with 60° geometry.

Adhesion: a film of 1.2 μm is applied on the tested substrate and exposed to UV radiations from a 120 W/cm non focalized medium pressure mercury lamp at a speed of 60 m/min and fully cured as described in the reactivity method. A string of adhesive tape (Tesa 4104) is pressed on the surface and the interlayer is degassed. The tape is then snatched off. Based on the % of the surface removed by the tape, a value of adhesion is given: 0 (100% of the squares removed), 1 (65-35% of the squares removed), 2 (35-15% of the squares removed), 3 (15-5% of the square removed), 4 (less than 5% of the squares removed, 5 (0%).

Acid number: The acid number (or acid value) is measured according to American Standard method (ASTM) D 974-64 and is expressed in mg KOH/g of product.

Hydroxyl value: The Hydroxyl value (or OHN value) is measured according to ASTM E 222-73 and is expressed in mg KOH/g of product.

Tack: Tack is the force required to split an ink film between two rollers by using a Tack-o-scope connected to a thermostatic water bath. The following conditions and equipment were used: Tack-o-scope with water bath at 30° C. for at least 30 min. Apply 0.3 cc of ink evenly across the front (distribution) roller of the Tack-o-scope. Place the front roller and the top (measuring) roller in contact with the central (drive) roller and distribute ink for 20 sec at speed 50 m/min. Record final tack value. Increase the speed to 100 m/min and keep for 20 s. Increase the speed to 150 m/min and keep for 20 s. Increase the speed to 200 m/min and keep for 20 s. Increase the speed to 250 m/min and keep for 20 s. Increase the speed to 300 m/min and keep for 20 s. Increase the speed to 350 m/min and keep for 20 s. Record the final tack value.

Chlorine content: Weight of the Chlorine stemming from loaded Chlorinated Anhydride (calculated by the theoretical % of Chlorine in the Chlorinated Anhydride molecule) is divided by the total weight of the final inert polyester. The total weight of the undiluted polyester is determined by unloading polyester and weighing it prior to dilution.

BINDER PREPARATION

Example 1 (CHDM, CI Content 24.6%)

152 g Diethylene glycol, 246 g Phtalic anhydride, 618 g Chlorendic anhydride and 466 g Cyclohexane dimethanol were charged to a double-wall glass reactor equipped with a stirrer, a thermocouple attached to a thermoregulator, a gas inlet tube, a connection to vacuum and an distillation column. The mixture was then heated to a temperature of about 165° C. The polycondensation was continued until no more water is distilled over. Reduced pressure was applied gradually reaching a vacuum of −900 mmHg while the acid value was decreased. Upon reaching an acid value of 50 mg KOH/g (DIN_EN_ISO_2114), a correction was made in either acid or diol based on delta between acid value and Hydroxyl value (DIN_53240_T2) when acid value is below 20 mg KOH/g (typically after 5-12 hours reaction), cooled down to 70° C. by diluting in 950 gram reactive monomer (TMPTA). 1425 g of the undiluted polyester was unloaded and recharged while diluting in 950 gram reactive monomer (TMPTA). The inert polyester thus obtained had a hydroxyl value of 130 mg KOH/g. The Mw of the polyester thus obtained was 1320 g/mol. The viscosity of the diluted polyester had a value of 1310 mPa s (measured with MCR equipment at 60° C.).

Example 2 (CHDM, Higher Molecular Weight, CI Content 17%)

199 g Diethylene glycol, 346 g Phtalic anhydride, 325 g Chlorendic anhydride and 236 g Cyclohexane dimethanol were charged to a double-wall glass reactor equipped with a stirrer, a thermocouple attached to a thermoregulator, a gas inlet tube, a connection to vacuum and an distillation column. The mixture was then heated to a temperature of about 177° C. The polycondensation was continued until no more water is distilled over. Reduced pressure was applied gradually reaching a vacuum of −900 mmHg while the acid value was decreased. Upon reaching an acid value of 50 mg KOH/g (DIN_EN_ISO_2114), a correction was made in either acid or diol based on delta between acid value and Hydroxyl value (DIN_53240_T2) when acid value is below 20 mg KOH/g (typically after 9-16 hours reaction), cooled down to 70° C. and 1048 g of the undiluted polyester was unloaded and recharged while diluting in 695 gram reactive monomer (TMPTA).

The inert polyester thus obtained had a hydroxyl value of 50 mg KOH/g. The Mw of the polyester thus obtained was 2685 g/mol. The viscosity of the diluted polyester had a value of 1750 mPa s (measured with MCR equipment at 60° C.).

Example 3 (CHDM, Higher Molecular Weight, CI Content 25.7%)

380 g Diethylene glycol, 480 g Phtalic anhydride, 1000 g Chlorendic anhydride and 450 g Cyclohexane dimethanol were charged to a double-wall glass reactor equipped with a stirrer, a thermocouple attached to a thermoregulator, a gas inlet tube, a connection to vacuum and an distillation column. The mixture was then heated to a temperature of about 177° C. The polycondensation was continued until no more water is distilled over. Reduced pressure was applied gradually reaching a vacuum of −900 mmHg while the acid value was decreased. Upon reaching an acid value of 50 mg KOH/g (DIN_EN_ISO_2114), a correction was made in either acid or diol based on delta between acid value and Hydroxyl value (DIN_53240_T2) when acid value is below 20 mg KOH/g (typically after 9-16 hours reaction), cooled down to 70° C. and 2203 g of the undiluted polyester was unloaded and recharged while diluting in 1468 gram reactive monomer (TMPTA).

The inert polyester thus obtained had a hydroxyl value of 60 mg KOH/g. The Mw of the polyester thus obtained was 2120 g/mol. The viscosity of the diluted polyester had a value of 1820 mPa s (measured with MCR equipment at 60° C.).

Comparative Example 1 (1R, Comparative, HBPA, no CHDM, CI Content 20.3%, Similar to EBECRYL®436 Polyester Acrylate)

78.4 g Diethylene glycol, 127.6 g Phtalic anhydride, 319 g Chlorendic anhydride and 403.8 g Hydrogenated Bisphenol A were charged to a double-wall glass reactor equipped with a stirrer, a thermocouple attached to a thermoregulator, a gas inlet tube, a connection to vacuum and a distillation column. The mixture was then heated to a temperature of about 165° C. The polycondensation was continued until no more water is distilled over. Reduced pressure was applied gradually reaching a vacuum of −900 mmHg while the acid value was decreased. Upon reaching an acid value of 60 mg KOH/g a correction was made in either acid or diol based on delta between acid value and Hydroxyl value (DIN_53240_T2) when acid value is below 50 mg KOH/g (typically after 5-12 hours reaction), cooled down to 70° C. 892 g of the undiluted polyester was unloaded and recharged while diluting in 610 g reactive monomer (TMPTA).

The inert polyester thus obtained had a hydroxyl value of 140 mg KOH/g. The Mw of the polyester thus obtained was 920 g/mol. The viscosity of the diluted polyester had a value of 1453 mPa s (measured with MCR equipment at 60° C.).

Comparative Example 2 (2R, Comparative, Isosorbide, no CHDM)

303 g Diethylene glycol, 494 g Phtalic anhydride, 1235 g Chlorendic anhydride and 945 g Isosorbide were charged to a double-wall glass reactor equipped with a stirrer, a thermocouple attached to a thermoregulator, a gas inlet tube, a connection to vacuum and an distillation column. The mixture was then heated to a temperature of about 165° C. The polycondensation was continued until no more water is distilled over. Reduced pressure was applied gradually reaching a vacuum of −900 mmHg while the acid value was decreased. Upon reaching an acid value of 50 mg KOH/g a correction was made in either acid or diol based on delta between acid value and Hydroxyl value (DIN_53240_T2) when acid value is below 20 mg KOH/g (typically after 5-12 hours reaction), cooled down to 70° C. and 2843 g of the undiluted polyester was unloaded and recharged while diluting in 1900 g reactive monomer (TMPTA).

The inert polyester thus obtained had a hydroxyl value of 160 mg KOH/g. The Mw of the polyester thus obtained was 1200 g/mol. The viscosity of the diluted polyester was 1420 mPa s (measured with MCR equipment at 60° C.).

Comparative Example 3 (3R, Comparative, no BPA, no CHDM)

(no cyclic polyol) 500 g Ethylene glycol, 81 g Trimetylolpropane, 706 g Chlorendic anhydride, 393 g isophtalic acid and 471 g phtalic acid were charged to a double-wall glass reactor equipped with a stirrer, a thermocouple attached to a thermoregulator, a gas inlet tube, a connection to vacuum and a distillation column. The mixture was then heated to a temperature of about 165° C. The polycondensation was continued until no more water is distilled over. Reduced pressure was applied gradually reaching a vacuum of −900 mmHg while the acid value was decreased. Upon reaching an acid value of 50 mg KOH/g a correction was made in either acid or diol based on delta between acid value and Hydroxyl value (DIN_53240_T2) when acid value was below 25 mg KOH/g (typically after 5-12 hours reaction), cooled down to 70° C. and 2068 g of the undiluted polyester was unloaded and recharged while diluting in 1300 gram reactive monomer (TMPTA).

The inert polyester thus obtained had a hydroxyl value of 112 mg KOH/g. The Mw of the polyester thus obtained was 1810 g/mol. The viscosity of the diluted polyester was 1571 mPa s measured with MCR equipment at 60° C.).

Comparative Example 4 (4R, Comparative, Non-Chlorinated, no CHDM)

784 g Diethylene glycol, 2453 g Phtalic anhydride and 4000 g Hydrogenated Bisphenol A were charged to a double-wall glass reactor equipped with a stirrer, a thermocouple attached to a thermoregulator, a gas inlet tube, a connection to vacuum and a distillation column. The mixture was then heated to a temperature of about 165° C. The polycondensation was continued until no more water is distilled over. Reduced pressure was applied gradually reaching a vacuum of −900 mmHg while the acid value was decreased. Upon reaching an acid value of 65 mg KOH/g a correction was made in either acid or diol based on delta between acid value and Hydroxyl value (DIN_53240_T2) when acid value was below 48 mg KOH/g (typically after 5-12 hours reaction), cooled down to 70° C. and 8870 g of the undiluted polyester was unloaded and recharged while diluting in 5950 gram reactive monomer (TMPTA).

Formulation:

The pigment paste was prepared as follows: 61 wt % of the binder prepared as mentioned above (diluted polyester) was mixed with further TMPTA (8 wt %) and with 30 wt % of pigment (Special Black 250 of Degussa) and 1 wt % of additives (stabilizer ADDITOL® S130 from allnex).

The paste was grinded on triple roll mill until the right grinding gauge of 7 Hegman Units or 12.7 Microns was obtained.

The ink was prepared from this pigment paste (72%) by mixing further with the binder (19%), with photoinitiator (8%) and diluting monomer (1% TMPTA) to achieve the target viscosity of about 100 Pa s at 25° C.

Photoinitiator mix composition: 30% Speedcure ITX (isopropylthioxanthone) from Lambson; 25% Speedcure EDB (Ethyl-4-dimethylamino benzoate) from Lambson; 25% Speedcure EHA (2-Ethylhexyl 4-(Dimethylamino)benzoate) from Lambson; 5% ADDITOL® PBZ from allnex.

Application Results

TABLE 1

| | cure speed | | | |
|---|---|---|---|---|
| | 1R (HBPA) | 3R | 2R (Isosorbide) | Example 1 (CHDM) |
| Visco 2.5 1/s | 118 | 133 | 120 | 107 |
| Visco 100 1/s | 39 | 32.2 | 34.1 | 34 |

TABLE 1-continued

| | cure speed | | | |
|---|---|---|---|---|
| | 1R (HBPA) | 3R | 2R (Isosorbide) | Example 1 (CHDM) |
| SI 2.5-100 | 3.0 | 4.1 | 3.5 | 3.1 |
| Density - 1.5 g/m² | 2.15 | 2.08 | 2.01 | 2.10 |
| Gloss - 1.5 g/m² 60° | 23 | 22 | 20 | 21 |
| Cure speed 140 W/cm | 20 | 2 × 20 | 2 × 20 | 20 |

The cure speed for the example according to the invention is higher than for isosorbide and for the industry standard. HBPA comparative example also provides high cure speed. This is advantageous as the composition only need one pass under the UV lamp instead of two, which permits money and time savings.

TABLE 2

| | Tack results | | | |
|---|---|---|---|---|
| | 1R (HBPA) | 3R | 2R (Isosorbide) | Example 1 |
| Tack @ 50 m/min | 320 | 225 | 240 | 220 |
| Tack @ 100 m/min | 525 | 415 | 380 | 325 |
| Tack @ 150 m/min | 680 | 540 | 470 | 425 |
| Tack @ 200 m/min | 810 | 640 | 570 | 510 |
| Tack @ 250 m/min | >830 | 720 | 640 | 580 |
| Tack @ 300 m/min | >830 | 760 | 700 | 640 |
| Tack @ 350 m/min | >805 | 760 | 695 | 655 |

Tack values for isosorbide comparative and for the example according to the invention are lower and more stable especially compared to HBPA based comparative example. For all measurements, the tack value obtained with the example is lower, thus better, than each of the comparatives.

TABLE 3

| Adhesion on plastics at 1 × 30 m/min and 3 × 30 m/min | | | | | | | |
|---|---|---|---|---|---|---|---|
| | 1R (HBPA) | | 3R | | 2R (Isosorbide) | | Example 1 |
| treatment | no corona treatment | | | | | | |
| Curing (30 m/min) - Substrates | 1× | 3× | 1× | 3× | 1× | 3× | 1× | 3× |
| PET | 1 | 5 | 5 | 5 | 5 | 5 | 5 | 5 |
| BOPP | 5 | 5 | 4+ | 4+ | 4+ | 4+ | 5 | 5 |
| PVC | 4+ | 4+ | 1 | 1 | 1 | 4+ | 5 | 5 |

With curing 1×30 m/min:
  on PET: bad adhesion for Comparative example with HBPA but OK for other compositions.
On PVC, bad adhesion was obtained for "the industry standard" and for Isosorbide. Good adhesion was obtained for Comparative example with HBPA and very good adhesion for the example according to the invention.
With curing 3×30 m/min:
Still no adhesion on PVC for the "industry standard" and for Isosorbide,
Adhesion for on PVC good for Comparative example with HBPA and very good for the example according to the invention.

For all tests conducted, the example according to the invention had always provided the most favorable results compared to the 3 other samples.

TABLE 4 delamination results
Delamination in function of the % Cl

| | 1 Layer Fmax | 2 Layers Fmax |
|---|---|---|
| 4R: Comparative example containing 0% Cl calculated on undiluted Polyester | <1 | <1 |
| 1R Comparative example containing 20.3% Cl calculated on undiluted Polyester | 3.55 | 2.98 |
| Example 1: Resin containing 24.7% Cl calculated on undiluted Polyester | 2.20 | 3.09 |
| Example 2: Resin containing 17% Cl calculated on undiluted Polyester | 2.70 | 2.69 |
| Example 3: Resin containing 25.7% Cl calculated on undiluted Polyester | 4.88 | 3.10 |

Bond-strength is the force (N) per unit area required to separate two adjacent layers of a package. Bond strength value was tested using a dynamometer.

A printed sample was prepared by putting the composition, formulated as an ink as described above, according to example 1, 2, 3 or comparative example 1 or 4 onto a substrate (polypropylene), using a hand coater, wet deposit thickness=2 micron and UV curing the applied layer. A second layer (2 micron wet deposit thickness) was applied on some samples, and UV cured.

A counter-substrate (Polyethylene) was provided with a layer of an adhesive using a hand coater and subsequently dried. The printed substrate was applied onto the adhesive layer, and the substrate and counter substrate were pressed against each other using rollers, thus forming a laminate.

The laminated printed sample was stored for 7 days at 25° C. to allow adhesive curing before delamination evaluation.

A sample was cut out of the laminate composition and was placed between two jaws. The sample was drawn out and the substrate was separated from the counter-substrate. At a speed of 200 mm/min, the bond strength value was determined, and the force (in N) needed to delaminate the sample was measured.

The results obtained with Comparative example 4R show that a non-chlorinated polyester does not provide enough adhesion.

The results obtained with comparative 1R show that a non BPA containing sample according to the invention can achieve similar results as commercial BPA containing sample and even better as shown in example 3.

The invention claimed is:

1. A radiation curable composition comprising
   (I) a radiation curable component comprising a compound having at least one ethylenically unsaturated group,
   (II) a chlorinated polyester component that is prepared from
      (A) a polyol component which is substantially free of any Bisphenol A derivative compound and which is substantially free of any cyclic ether polyol compound, said polyol component comprising a polyol compound (Ai) which is cyclic, which has at least two hydroxyl groups, and wherein the polyol component (A) comprises at least 40% by weight of one or more cyclic polyol(s) (Ai), and
      (B) a polycarboxylic acid component comprising a compound (Bi) having at least one chlorine group and at least two carboxyl groups,
      (C) optionally at least one monoalcohol compound,
      (D) optionally at least one monocarboxylic acid compound,
      (E) optionally at least one polycarboxylic acid compound substantially free of chlorine groups,
   wherein the chlorine content of the chlorinated polyester (II) is between 15 and 75%, and
   wherein the chlorinated polyester (II) has a number average molecular weight of between 500 and 5000 Daltons, and
   (III) optionally an additional radiation curable component comprising at least one oligomeric compound having at least two radiation curable ethylenically unsaturated groups,
   wherein the radiation curable component (I) and the chlorinated polyester (II) are different from each other.

2. The radiation curable composition according to claim 1, wherein the polyol component (A) additionally comprises an acyclic aliphatic polyol compound (Aii), optionally including at least one ether function.

3. The radiation curable composition according to claim 1, wherein the cyclic polyol compound (Ai) comprises 1,4-cyclohexanedimethanol (CHDM).

4. The radiation curable composition according to claim 1, wherein the compound (Bi) comprises chlorendic acid.

5. The radiation curable composition according to claim 4, wherein the polycarboxylic acid compound (E) comprises phthalic acid.

6. The radiation curable composition according to claim 1, wherein the equivalent ratio of hydroxyl groups to carboxyl groups exceeds 1.0.

7. The radiation curable composition according to claim 1, wherein the ethylenically unsaturated compound (I) comprises at least one (meth) acrylated compound selected from the group consisting of di(meth) acrylates, tri (meth) acrylates, tetra(meth) acrylates, penta (meth) acrylates, and hexa (meth) acrylates.

8. The radiation curable composition according to claim 1, wherein the chlorine content of the chlorinated polyester (II) is from 15 to 30%.

9. The radiation curable composition according to claim 1, comprising at least one additive selected from the group consisting of a photoinitiator, pigment, wetting agent, pigment dispersant, leveling agent, inhibitor, dispersing agent, stabilizer, antifoam agent, and filler.

10. The radiation curable composition according to claim 1, wherein the oligomeric compound (III) has a backbone comprising one or more selected from the group consisting of ester, ether, urethane, epoxy, acrylic, and amino group.

11. An adhesive, coating, ink or varnish composition comprising the radiation curable composition according to claim 1.

12. An article coated, partially or entirely, with the composition according to claim 11.

* * * * *